Figure 1:
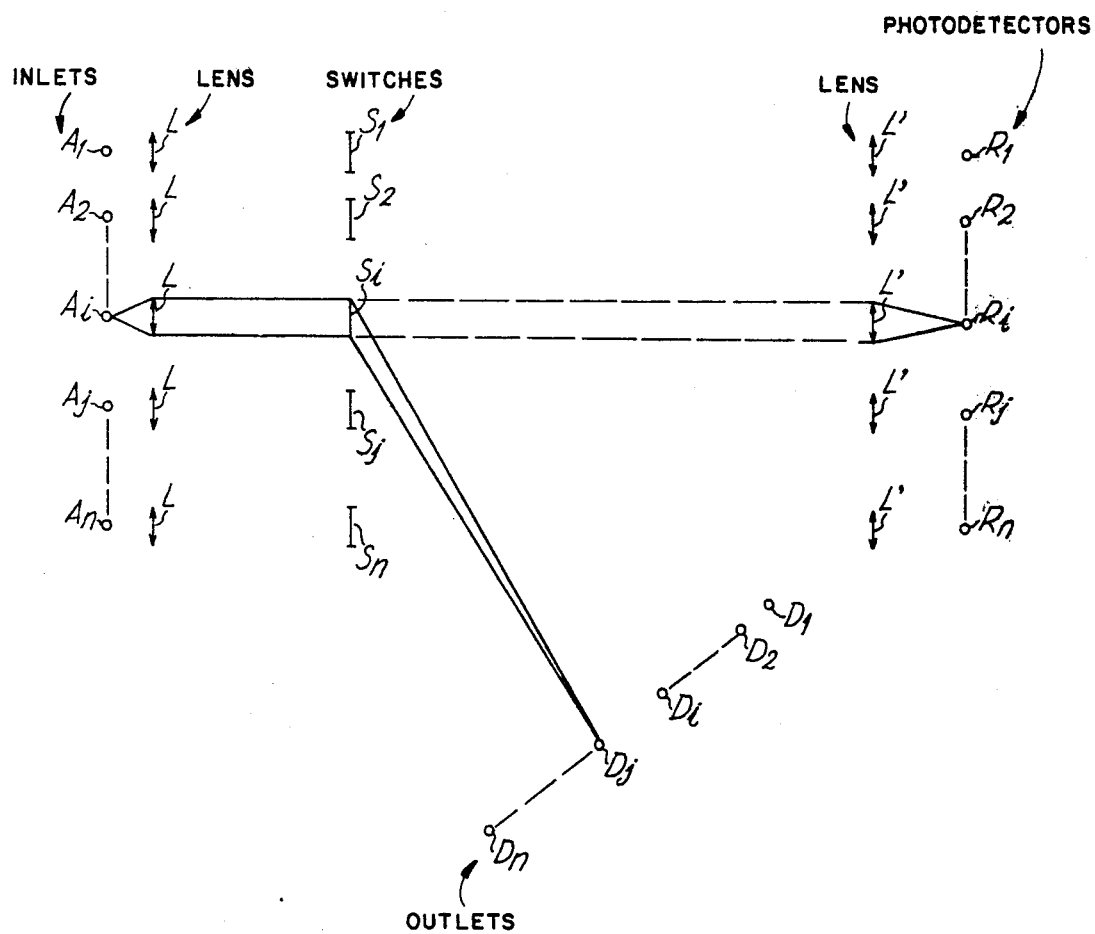

United States Patent [19]

Treheux et al.

[11] 4,256,927

[45] Mar. 17, 1981

[54] SPACE DIVISION SWITCHING SYSTEM FOR COMMUNICATION NETWORKS USING OPTICAL SIGNAL FREQUENCIES

[76] Inventors: Michel E. Treheux, An Tri Breud, rue des Iles-l'Ille Grande, 22560 Plemeur-Bodou; René J. Lacroix, Rue Ampère, 22700 Perros-Guirec, both of France

[21] Appl. No.: 31,132

[22] Filed: Apr. 18, 1979

[30] Foreign Application Priority Data

Apr. 21, 1978 [FR] France .................................. 78 12862

[51] Int. Cl.$^3$ .......................... G02B 5/32; H04B 9/00; H04M 1/00; H04Q 3/48
[52] U.S. Cl. ................................. 179/18 E; 179/18 J; 179/81 R; 179/84 T; 350/3.78; 455/607; 455/612; 455/613
[58] Field of Search .................. 179/18 E, 18 J, 18 G, 179/18 GF, 18 FG, 18 FA, 81 R, 84 T; 250/199; 350/3.75, 3.78; 455/607, 612, 613

[56] References Cited

U.S. PATENT DOCUMENTS

| | | | |
|---|---|---|---|
| 3,651,498 | 3/1972 | Magill et al. ................. | 340/174.1 M |
| 3,831,035 | 8/1974 | Hill ................................... | 350/3.78 X |
| 3,985,975 | 10/1976 | Steensma ........................ | 179/18 GF |

FOREIGN PATENT DOCUMENTS

1399664 7/1975 United Kingdom ............... 179/18 GF

OTHER PUBLICATIONS

"Optical Memory used in Wave Band Data Communication", by Lacroix et al., Second European Electro-Optics Markets and Technology Conference [undated].

*Primary Examiner*—Thomas W. Brown
*Attorney, Agent, or Firm*—Laff, Whitesel & Rockman

[57] ABSTRACT

According to a feature of this invention, there is provided a space-division and control system for a network operating with space-division switching of information modulating optical carrier frequencies, wherein the switches are arranged between a plurality of inlets and a plurality of outlets and are light deflection hologram elements that can store a plurality of holographic optical arrays, each switch being associated to an inlet from which it receives an impinging light wave and in each switch each holographic optical array deflecting the impinging light wave along a direction of an order different from the O-order direction toward an outlet selected among the plurality of outlets, wherein in the O-order direction of each switch there is a photodetector whose output signals reflect the lit or unlit condition of the associated inlet and are transmitted to the switching control unit of the space-division and control system.

9 Claims, 3 Drawing Figures

SPACE DIVISION SWITCHING SYSTEM FOR COMMUNICATION NETWORKS USING OPTICAL SIGNAL FREQUENCIES

The present invention relates to a space-division switching and control system for a network with space-division switching of information modulating optical carrier frequencies, such a system being particularly useful in telephone switching networks or more generally in telecommunication networks.

It is known that, in a space-division switching network, switches or groups of switches are provided which can, continuously the duration of call, couple an incoming line or trunk to an outgoing line or trunk.

Space-division switching networks have already been described, particularly in the French patent applications published under No. 2,171,241 (equivalent to U.S. Pat. No. 3,831,035) and 2,243,573, which are capable of transmitting light frequency signals, wherein switches are light deflection components made of selectively controlled holograms. Each optical inlet of the network corresponds to a switch, i.e. a selectively controlled light deflection hologram element. Each light deflection hologram switch makes it possible to deflect applied light toward any one among a plurality of outlets. The above mentioned patent applications particularly described how, as a result of a recording control, a hologram is recorded on a light deflection hologram switch which allows it to deflect light received from the associated inlet toward the outlet determined by the recording control. As far as a telephone switching technique is concerned, such a recording control is called a marking operation that is usually performed by a marker circuit. Such a light frequency signal, space-division switching network is also described in a technical article entitled "Optical Memory used in Wide Band Data commutation" by R. Lacroix and Y. Bessonnat, at the "Second European Electro-optics Markets and Technology Conference", records, pages 206-210.

The French Pat. No. 2,295,666 also described a space-division switching network wherein switches are light deflection elements provided with photochromic obturators. A background light emitter associated with the photochromic obturators that are either transparent or not, makes it possible to determine by means of light detector which lines are busy. That supervision system does not allow detection of calling line conditions. Moreover, the transparence condition of a photochromic obturator is controlled by a control circuit with the result that the detection of a transparence condition is not directly related to the actual busy or idle line condition, particularly for a calling line.

A purpose of this invention is to provide a supervision system which does not have such drawbacks.

In practice, every selective control light deflection hologram element constitutes an individual optical array. It is to be noted that an optical array is comprised of a regular series of stripes having different alternative optical characteristics, from one array to the next one. The best known conventional optical array is made of a series of black and white stripes, but the most current optical arrays in use are phased arrays wherein the concerned optical characteristic results from either thickness or refractive index variations, which vary the product n.e, wherein n is the refractive index and e the thickness.

Regarding theoretical aspects of optical arrays, references may particularly be made to the French technical book "Optique" by Bruhat, page 263, or the French technical book "Images optiques" by Fleury and Mathieu, pages 398-402. In the following, there will be more particularly considered optical arrays operating by transmission. Such an optical array deflects a plane impinging wave into directions $\theta_o$, $\theta_1$, $\theta_{-1}$, $\theta_2$, $\theta_{-2}$, etc., called diffraction orders. As a function of the array characteristics and the impinging wave, the relation between angles of those directions is given by the following approximate expression:

$$\sin \theta_i = i(\lambda/a)$$

wherein i is the diffraction order, a the array spacing and $\lambda$ the light wavelength of the impinging wave. The angles is measured with respect to a plane normal to the array plane and parallel to the array stripes. The intensity of each order varies with the nature of the optical array. Certain phased arrays, such as the phased arrays utilized according to the present invention make it possible to concentrate an important portion of the transmitted light in the 1st order. Particularly, the blazed arrays or the thick arrays are well known to people skilled in the art.

In practice, even when an important portion of the transmitted light is successfully concentrated in the 1st order, a substantial portion of the transmitted light remains in the order 0, that is without deflection through the optical array.

A purpose of the present invention is to use the last mentioned feature to provide the entire supervision function for the lines of a space-division switching network comprising selective control hologram switches. Such as those hereabove defined, such a supervision function is added to the switching function and the marking function, which are considered as already known in the art.

According to a feature of this invention, there is a space-division and control system for a network operating with space-division switching. Information is transmitted by modulating optical carrier frequencies, wherein the switches are arranged between a plurality of inlets and a plurality of outlets. The switches are light deflection hologram elements that are capable of storing a plurality of holographic optical arrays. Each switch is associated with an inlet from which it receives an impinging light wave. In each switch, each holographic optical array deflects the impinging light wave along a direction in an order which is different from the 0-order direction toward an outlet, selected among the plurality of outlets. In the 0-order direction, each switch includes a photodetector whose output signals reflect the lit or unlit condition of the associated inlet. These signals are transmitted to the switching control unit of the space-division and control system.

Figure 2:
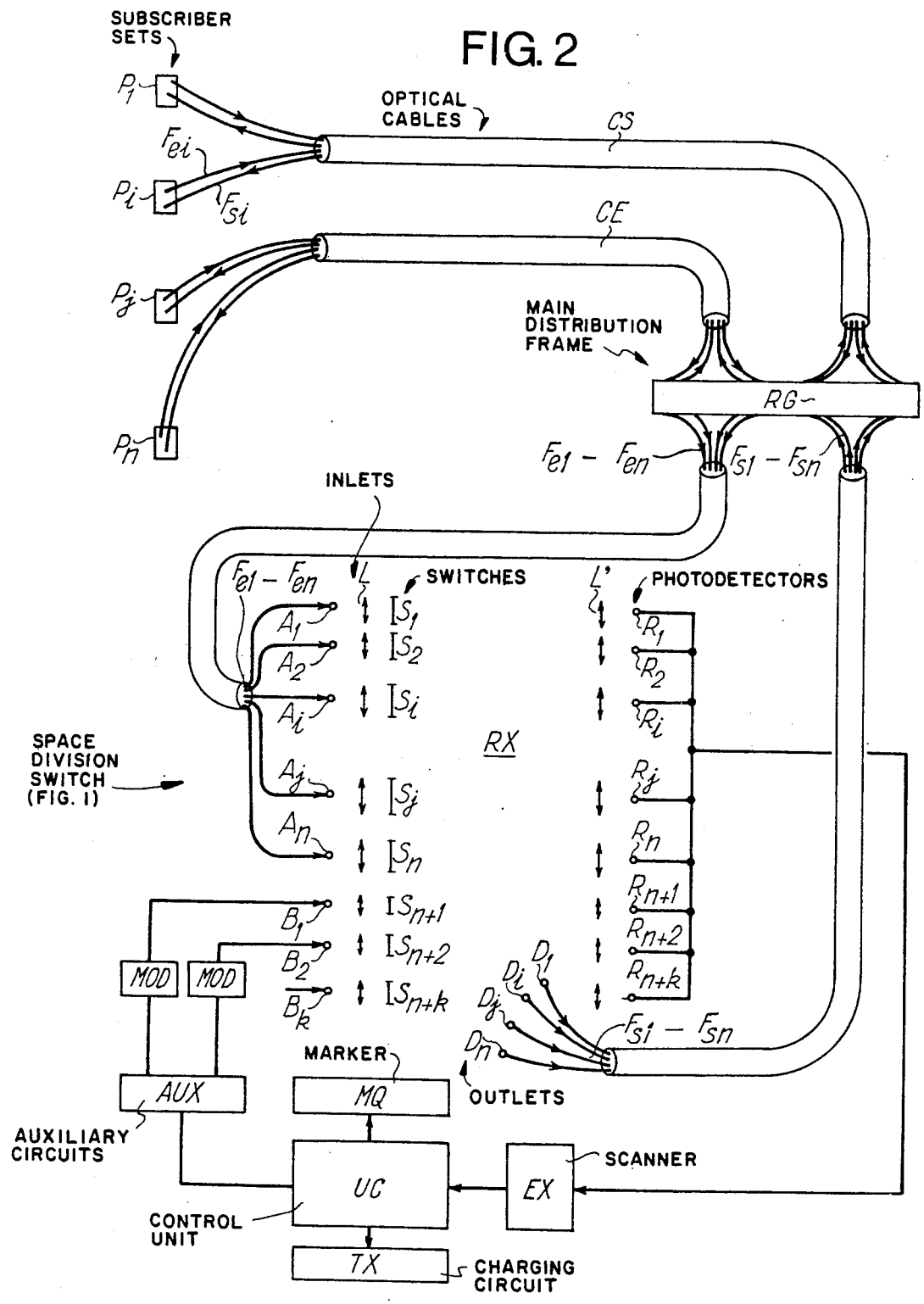
Figure 3:
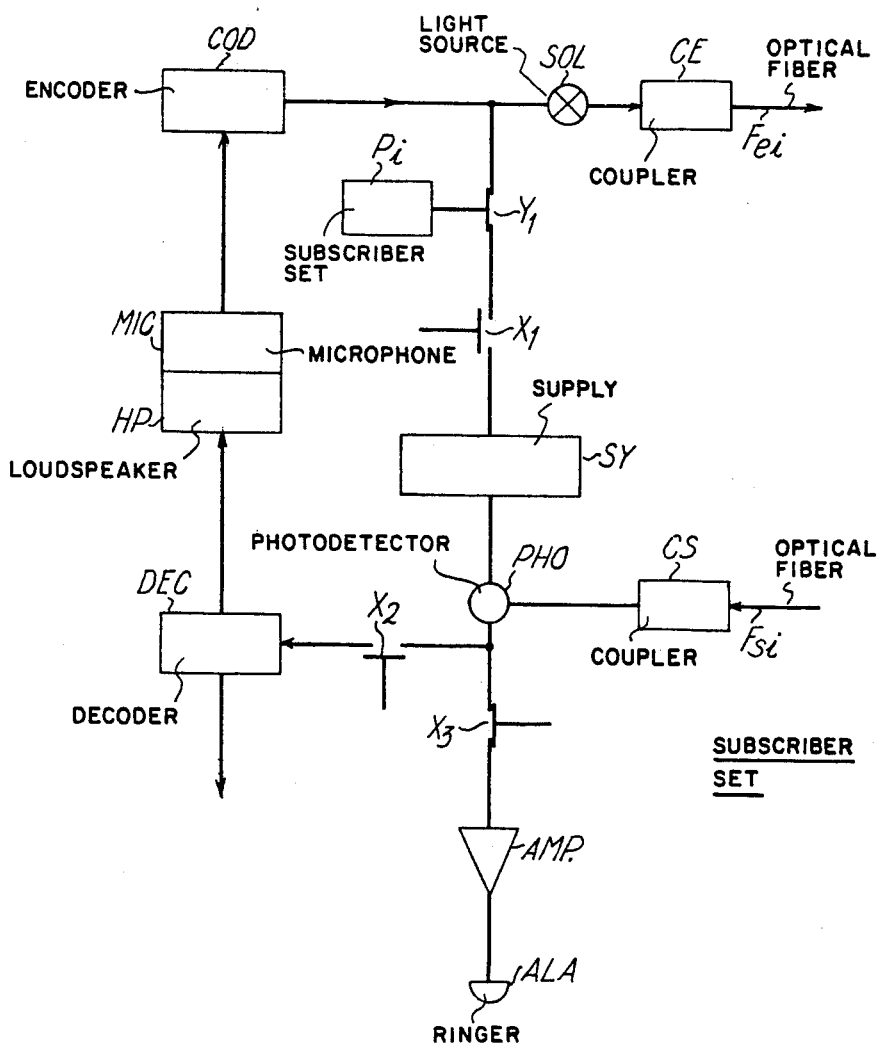

The above mentioned feature of the present invention, as well as others, will appear more clearly from the following description of an embodiment, the description being made in conjunction with the accompanying drawings, wherein:

FIG. 1 is a schematic view illustrating how the superivision function is performed according to this invention, FIG. 2 is a schematic diagram of a space-division switching network according to this invention, and FIG. 3 is the schematic diagram of a subscriber set that may be used with the space-division switching system shown in FIG. 2.

FIG. 1 shows a plurality of optical inlets A1-An, a plurality of switches S1-Sn and a plurality of optical outlets D1-Dn. Each switch S1-Sn is definitely associated with an optical inlet A1-An. At any time, each switch S1-Sn can store one among n holographic optical arrays which are specific to that switch. Thus, when the switch Si stores the optical array j, among the n arrays it can store, the light wave received from inlet Ai, associated with switch Si, is deflected toward outlet Dj which is constructively being on the 1-order direction of the array j of the switch Si.

It appears that, when it is desired to transmit light delivered from an inlet Ai toward an outlet Dj, that is to perform the switching from inlet Ai to outlet Dj, the switch Si must be controlled for storing the array j, which means that the switch Si must be marked by the array j. In the preamble of the present specification, it has been stated that the switching and marking operations, as they have just been described, are known in the art. Therefore the details of those two operations will not be given in the following. It will simply be recalled that each switch must be able to record or store each holographic optical array that it is ordered to record or store. In this respect, known photochromic materials, photoferroelectric materials and photothermoplastic materials may be used in the composition of switches S1-Sn. Useful references might be found in the specification of the French certificate of utility No. 2,311,491. Magneto-optic materials may also be used.

In front of each inlet A1-An, a lens L is shown in order to clearly indicate that the waves applied to switches S1-Sn are plane light waves, while this condition is not compulsory.

Furthermore, according to this invention, a plurality of photodetectors R1-Rn are used. Each photodetector Ri is exclusively associated with an inlet Ai and located on the O-order direction of the corresponding switch Si, when it is illuminated from inlet Ai. In the described embodiment, it has been assumed that Ai, Si and Ri are aligned. As the waves delivered from switches Si in the O-order directions are plane waves, a focussing lens L' is provided in front of each photodetector Ri.

It is to be noted that, whatever holographic optical array is recorded in switch Si, as soon as the source Ai transmits a light wave, either carrying or not carrying signals, and during the entire time of that transmission, the photodetector Ri delivers an electric current. Reversely, when the source Ai transmits no light at all, the photodetector Ri delivers no current. Thus the output current condition for the photodetector Ri corresponds to the condition of the source Ai, either lit or not.

The above mentioned property is utilized in the space-division switching system shown in FIG. 2, as it will be now described. An assumption is made that the system shown in FIG. 2 corresponds to a local switching exchange used for establishing telephone communications between the subscriber sets P1-Pn.

Each subscriber set Pi is connected by an incoming optical fiber Fei and an outgoing optical fiber Fsi to one side of a main distribution frame. The fibers Fe1-Fen are assembled into an input optical cable CE leading to the cable outlets that serve as sources A1-An in an optical space-division switching exchange RX, using holographic optical array switches S1-Sn, similar to those shown in FIG. 1. Outlets D1-Dn of exchange RX constitute the inlets of fibers Fs1-Fsn which are assembled in an output optical cable CS, and then connected to the main distribution frame RG on the exchange side.

Thus it appears that if both switching from point Ai to point Dj, through switch Si, and switching from point Aj to point Di, through switch Sj, are simultaneously performed, a connection is established which is of the type known in conventional telephone exchange as a four-wire connection. Indeed fiber Fei of set Pi is connected, through network RX, to fiber Fsj of set Pj, and fiber Fej of set Pj is connected, through network RX, to fiber Fsi of set Pi.

As already mentioned in relation with FIG. 1, the exchange network RX still comprises photodetectors R1-Rn whose output wires are respectively connected to the inputs of a scanning circuit or scanner EX. The output(s) of scanner EX are connected to the input(s) of a control unit UC. An output of control unit UC is connected to a marker MQ. Another output of control unit UC is connected to an assembly of auxiliary circuits AUX. Finally, a third output of control unit UC is connected to an automatic charging circuit TX. The output of each auxiliary circuit AUX is connected to a modulator MOD whose output is connected to an optic fiber Mi. The other end of the fiber Mi is connected to an inlet Bi of the exchange network RX, in the same manner as fibers Fei are connected to inlets Ai. In practice, inlets B1-Bk, an inlets A1-An, are associated with switches $S(n+1)-S(n+k)$, which are identical to switches S1-Sn, and to photodetectors $R(n+1)-R(n+k)$, which are identical to photodetectors R1-Rn. Switches $S(n+1)-S(n+k)$ switch a light wave transmitted from the corresponding inlet toward any of outputs D1-Dn. Photodetectors $R(n+1)-R(n+k)$ are also connected to corresponding inputs of scanner EX.

The operation of the system shown in FIG. 2 will now be described, assuming that subscriber set Pi is calling and desires to communicate with subscriber set Pj, which becomes the called subscriber set. On going off-hook at the handset of subscriber set Pi, fiber Fei begins to transmit light to inlet point Ai, then through switch Si toward photodetector Ri whose output is delivering current which scanner EX detects a calling condition for set Pi and transmits a suitable information signal to control unit UC. The subscriber Pi dials the call number of the set Pj with the result that light is correspondingly interrupted in fiber Fei, those interruptions being detected in set Pi and transmitted to control unit UC, through scanner EX. Control unit UC searches in its memory tables to determine whether the set Pj is idle or is not idle, and, if idle, it delivers to marker MQ the order to attend to the recording in switch Si of a hologram ij that deflects a portion of the light transmitted from inlet Ai toward outlet Dj. Another portion of that light continues, to reach photodetector Ri. Light received in outlet Dj is transmitted to called set Pj, through fiber Fjs. Reception of light in set Pj triggers the operation of an alarm or a ringer. When the subscriber of set Pj removes his handset, light is transmitted along fiber Fje to point Aj and then to photodetector Rj, through switch Sj. Scanner EX can transmit to the control unit UC, the off-hook information for the called set Pj. Control unit UC delivers to marker MQ the order to attend to the recording in switch Sj of a hologram ji that deflects a portion of the light transmitted from inlet Aj to outlet Di, through switch Sj. Then the communication is established between the two subscribers.

At the same time that control unit UC delivers to marker MQ the order to attend to the recording of hologram ij in Si, it can also deliver hologram n+1,i to marker MQ the order to attend to the recording in switch S(n+1), that is associated with inlet B1 corresponding to the auxiliary circuit delivering the ringbacktone. The calling subscriber can listen to ring-back tone, responsive to a signal through fiber Fsi, and know that the called subscriber is idle and being rung. As soon as subscriber Pj answers, control unit UC orders the marker MQ to erase the hologram n+1,j.

For the duration of the call, photodetector Ri continues to receive light from inlet point Ai, what is detected by scanner EX and transmitted to control unit UC, that derives therefrom the charge which is to be transmitted to circuit TX.

As soon as one of the subscribers Pi or Pj hangs up, photodetector Ri or Rj no longer transmits a signal to scanner EX and control unit UC orders marker MQ to erase hologram ij and hologram ji. At the same time, it might, in an alternative for establishing the charge, transmit the whole charge to TX circuit. Finally, if one of the subscribers has hooked on, the other one does not hang up, it is detected by one of detectors Ri or Rj. Responsive thereto, control unit UC transmits to marker MQ the order for recording the hologram n+m,i or n+m,j recorded in switch S(n+m), which is associated to inlet Bm that corresponds to the auxiliary circuit delivering the busy tone. When the concerned subscriber hangs up, that hologram is erased.

When the search is performed in control unit UC for determining whether the called subscriber line is idle or busy, if it appears in the busy condition, the operation is the same as when a subscriber has not hung up after a conversation, as hereabove described.

FIG. 3 schematically shows an embodiment of a subscriber set Pi. It includes the ends of the incoming optical fiber Fei and the outgoing optical fiber Fsi. The input of fiber fei is connected from output of a compouler CE whose input is connected from ouput of a light source SOL, those components constituting the optical portion in the transmission channel. The output of fiber Fsi is connected to an input of coupler CS whose output is connected to optical input of a photodetector PHO, those components constituting the optical portion in the reception channel. An electric modulation input of source SOL is connected, on the one hand, from an output of an encoder COD and, on the other hand, from a terminal of a supply circuit SY, through the make contact X1 of the subscriber hook switch serially connected with the break contact Y1 of the suscriber dial. The supply input of photodetector PHO is permanently connected from an output terminal of supply circuit SY. The electric signal output of photodetector PHO is connected, on the one hand, to the input of a decoder DEC, through a make contact X2 of the suscrier hook switch, and, on the other hand, through a break contact X3 of the suscrier hook switch and an amplifier AMP, to an alarm device or a ringer ALA. The input of encoder COD is connected from an output of utilization circuit MIC, such as output of a microphone. The output of decoder DEC is connected to an input of an utilization circuit HP, such as the input of a loudspeaker.

The operation of the subscriber set shown in FIG. 3 will now be described. When the suscriber operating the set removes the handset to initiate a call, hook switch make contacts X1 and X2 close and break contact X3 opens. Through the closed make contact X1, the supply voltage is applied from supply SY to the light source SOL, break contact Y1 being at rest. Source SOL delivers a light wave toward fiber Fei, through coupler CE, which causes a calling condition detection in the switching network, shown in FIG. 2. Then the calling subscriber operates the dial which causes conventional break contact Y1 to intermittently open and close. The light wave transmitted from light source SOL is interrupted, the light breaks being detected and processed in control unit UC, FIG. 2. As hereabove described, when the called subscriber set is idle, fiber Fsi transmits a light wave that is applied, through coupler CS, to photodetector PHO which applies the corresponding signal to decoder DEC, to transmit the ring-back tone. When the called subscriber set goes off hook, speech signals are received through fiber Fsi, photodetector PHO and decoder DEC, and applied to loudspeaker HP. The calling subscriber speaks into his microphone and micophone signals are transmitted, through encoder COD, light source SOL and fiber Fei, to the other called subscriber set.

When an idle set is called, fiber Fsi applies light wave to photodetector PHO, and break contact X3 closes. The output signal from photodetector PHO is applied to amplifier AMP whose output initiates ringing in the ringer device ALA. When the called subscriber set goes off hook, the above mentioned operation is resumed.

In practice the light source SOL may be an electroluminescent diode, a laser diode or a laser source that can be modulated. The photodetector PHO may be a photodiode PIN or an avalanche photodiode.

In the above description of FIG. 2, an assumption has been made that the subscriber set Pi was provided with a dial, as in conventional telephone set, wherein dialing signals result in light interruptions. Obviously the set Pi might also be provided with a push dial board for generating multifrequency tone signals for modulating the light delivered to fiber Fei, such a modulation being decoded in photodetector Ri.

The utilization circuit MIC may be an apparatus other than a microphone, i.e. an apparatus for transmitting telephone, telecopy or television signals. The fibers, sources and detectors usable in the system, according to this invention, easily enable a transmission of the corresponding maximum frequencies and bandwidths.

Similarly the circuit HP, instead of being a loudspeaker, may be a picture terminal, a telecopy terminal or a television receiver.

Also to be noted is that the group of signalling signals, such as dialling signals, back ringing signals, ring signals, calling condition signals on inlet Ai and photodetector Ri, may be converted by a specific encoding of the optical frequency carrier. Such an encoding may be, for instance, performed by means of a sub-carrier, such as a pure frequency at 500 Hz, with synchronous detection in a selective amplifier, such as the amplifier AMP, FIG. 3. In addition, an encoding of that type permits permanently checking of the lines.

Obviously, instead of using holographic optical arrays, other types of optical arrays may be used when they are easily generated and erased, which are still called "restorable optical arrays".

The the assembly of photodetectors Ri and the scanner EX may be embodied under the form of a matrix of charge transfer photodetectors or an integrated matrix of bipolar photodetectors switched by MOS transistors.

What is claimed is:

1. A space-division switching and control system comprising a network of space-division switching means for information modulated optical carrier frequencies, the switches of said network being arranged between a plurality of inlets and a plurality of outlets, each of said switches comprising light deflection restorable optical element means capable of recording a plurality of restorable optical arrays, means for associating each of said switches with an inlet from which it receives impinging light waves, means responsive to each optical array in each switch for deflecting impinging light waves along a direction which is different for an O-order direction toward a selected outlet among the plurality of outlets, and photodetector means in the O-order direction of each switch for giving output signals which indicate the lit or unlit condition of the associated inlet, said output signals being transmitted to a switching control means associated with the space-division switching and control system.

2. A space-division switching and control system according to claim 1 and scanner means between a plurality of photodetector means and the control means, said scanner means checking in a time-division mode the output condition of each photodetector means.

3. A space-division switching and control system according to claim 1 or 2, wherein each of said restorable optical arrays comprises switches of the holographic type of restorable optical arrays.

4. A space division switching and control system according to claim 1 or 2, wherein said photodetector means comprise a plurality of individual photodetector means respectively individually associated with said switches, said plurality of photodetector means being in the form of a matrix of charge transfer photodetectors.

5. A space division switching and control system according to claim 1 or 2, wherein said photodetector means comprise a plurality of individual photodetector means respectively individually associated with said switches, said plurality of photodetector means being in the form of an integrated matrix of bipolar photodetectors switched by MOS transistors.

6. A space-division switching and control system according to claim 1 or 2 and a plurality of subscriber sets connected to the space-division light-deflecting network in at least a terminal portion adjacent to said space-division network, forward optical fiber means for transmitting light modulated by a microphone in a subscriber set to an inlet of said network and a backward optical fiber means for transmitting the modulated light from said network to a subscriber set, each of said forward fiber means being connected to an inlet of said switching network and each of said backward fiber means being connected from an outlet of said switching network, a call between two of said subscriber sets making use of two of said inlets and two of said outlets, two of said switches and two of said photodetector means, respectively.

7. A space-division switching and control system according to claim 6, wherein the backward fiber means are respectively connected to photodetectors in the subscriber sets for transmitting the light modulation to an output transducers in each subscriber set, said photodetector in the subscriber set being permanently enabled to initiate ringing under control of a light signal received over said backward fiber means when the subscriber set is on hook.

8. A space-division switching and control system according to claim 5 and semi-conductor laser diode light source means for supplying light to the fibers.

9. A space-division switching and control system according to claim 5 and electroluminescent diode light source means for supplying light to the fibers.

* * * * *

UNITED STATES PATENT AND TRADEMARK OFFICE
CERTIFICATE OF CORRECTION

PATENT NO. : 4,256,927
DATED : March 17, 1981
INVENTOR(S) : TREHEAUX & LACROIX

It is certified that error appears in the above—identified patent and that said Letters Patent is hereby corrected as shown below:

Col. 1, Line 14 after "continuously" insert --for--

Col. 4, Line 28 "an" s/b/ --as--

Col. 5, Line 41-2 "compouler" s/b/ --coupler--

Col. 6, Line 62 "permanently" s/b/ --permanent--

Signed and Sealed this

Fifteenth Day of September 1981

[SEAL]

Attest:

Attesting Officer

GERALD J. MOSSINGHOFF

Commissioner of Patents and Trademarks